United States Patent [19]

Deguchi

[11] 4,314,524
[45] Feb. 9, 1982

[54] APPARATUS FOR TRANSFER AND TREATMENT OF APERTURED ARTICLES

[75] Inventor: Osamu Deguchi, Iwata, Japan

[73] Assignee: NTN Toyo Bearing Company, Limited, Osaka, Japan

[21] Appl. No.: 127,447

[22] Filed: Mar. 5, 1980

Related U.S. Application Data

[63] Continuation-in-part of Ser. No. 926,200, Jul. 19, 1978, abandoned, which is a continuation of Ser. No. 698,594, Jun. 22, 1976, abandoned.

[30] Foreign Application Priority Data

Jun. 24, 1975 [JP] Japan ............................ 50-78952
May 7, 1976 [JP] Japan ............................ 51-52500

[51] Int. Cl.$^3$ ........................ B05C 3/09; B05C 13/02
[52] U.S. Cl. ..................................... 118/54; 118/416; 118/425; 118/503; 134/134; 134/149
[58] Field of Search ............... 118/54, 56, 55, 416, 118/425, 426, 503; 134/78, 79, 141, 149, 134; 427/346, 240; 279/1 R, 1 B

[56] References Cited

U.S. PATENT DOCUMENTS 1,779,366 10/1930 Bloss et al. ........................ 118/54
3,384,048 5/1968 Kutcher ........................ 118/503 X
3,482,584 12/1969 Schipke ........................ 134/141 X Primary Examiner—John P. McIntosh
Attorney, Agent, or Firm—Hall & Houghton

[57] ABSTRACT

Apparatus comprising a vertically movable arm member pivoted at one end about a vertical axis and a chucking head mounted at the other distal end thereof, for engagement with and holding an apertured article, said chucking head being arranged to rotate the chucked article and whereby apertured articles being successively fed to a loading position are subjected to a revolving movement and an upward movement while being transferred to an unloading position via a working position where they are subjected to a desired treatment.

5 Claims, 11 Drawing Figures

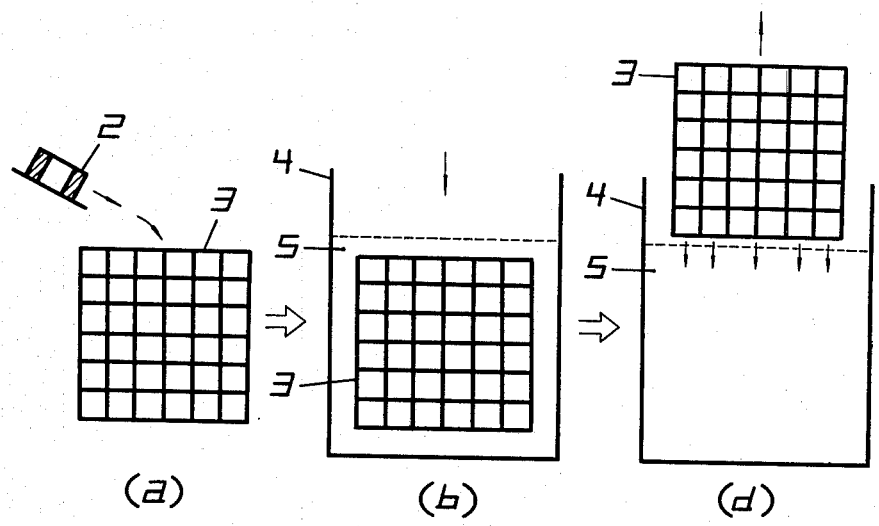
FIG_1 (PRIOR ART)
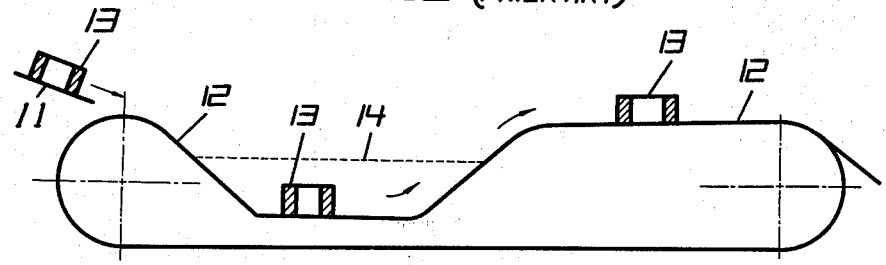
FIG_2 (PRIOR ART)

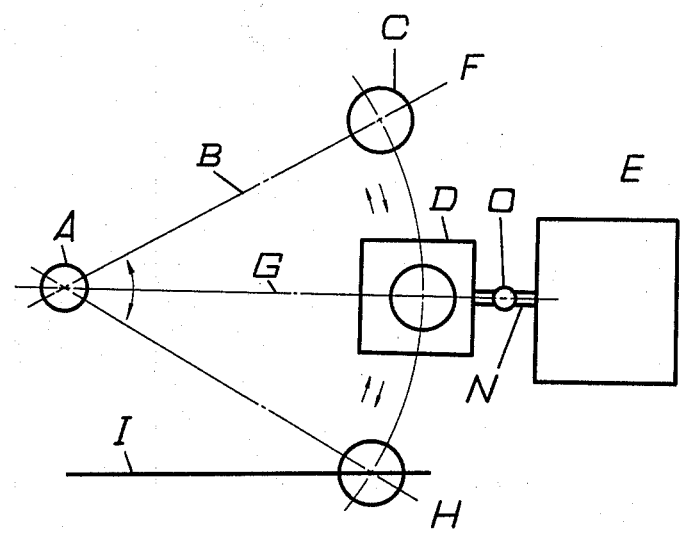
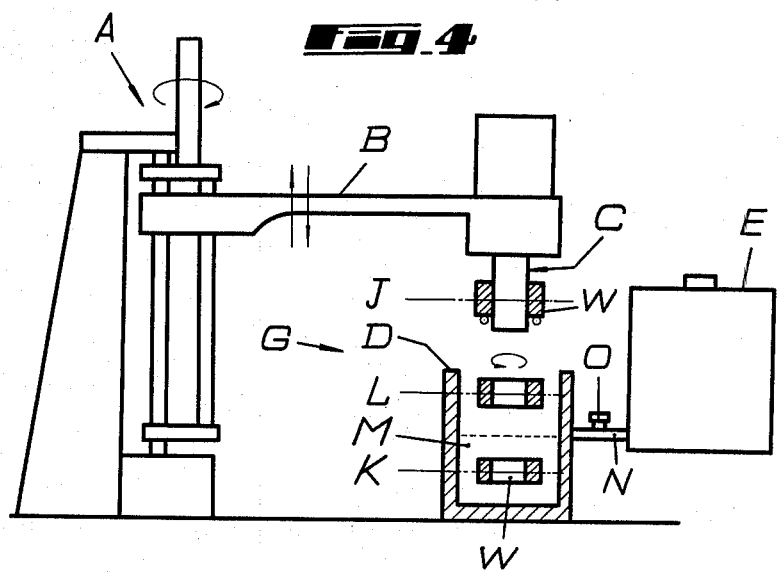

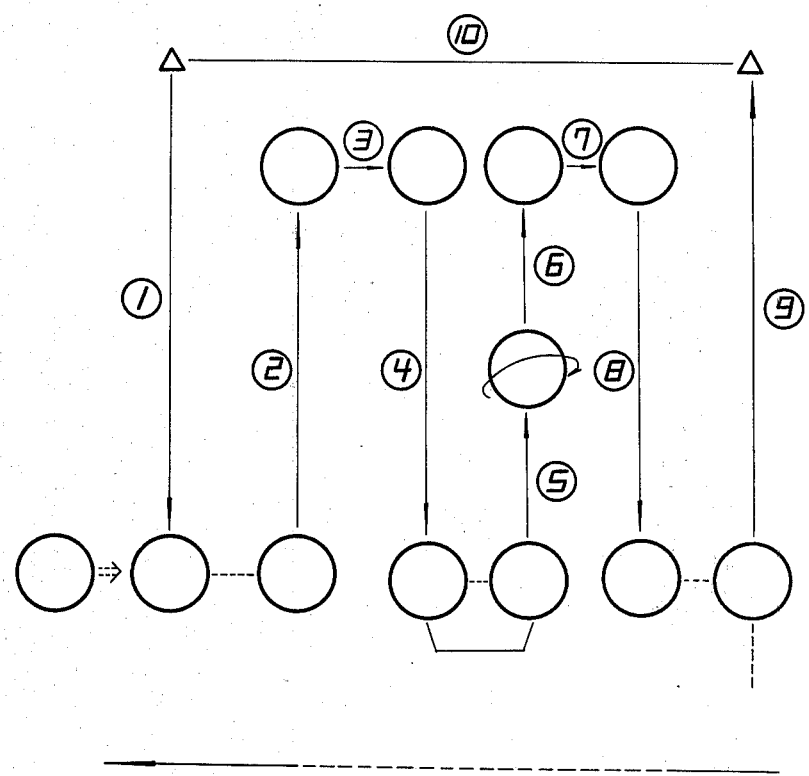
Fig_5

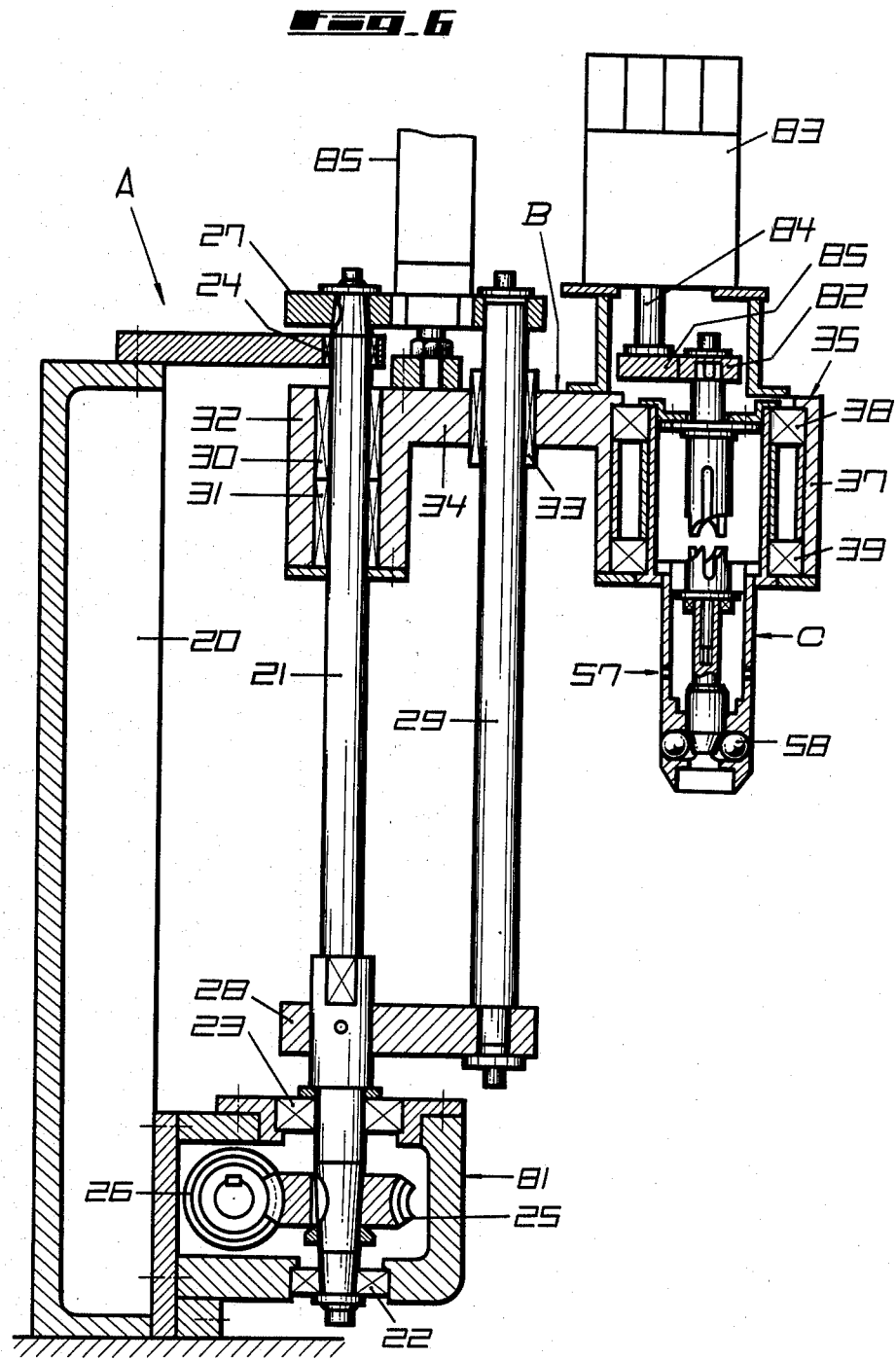

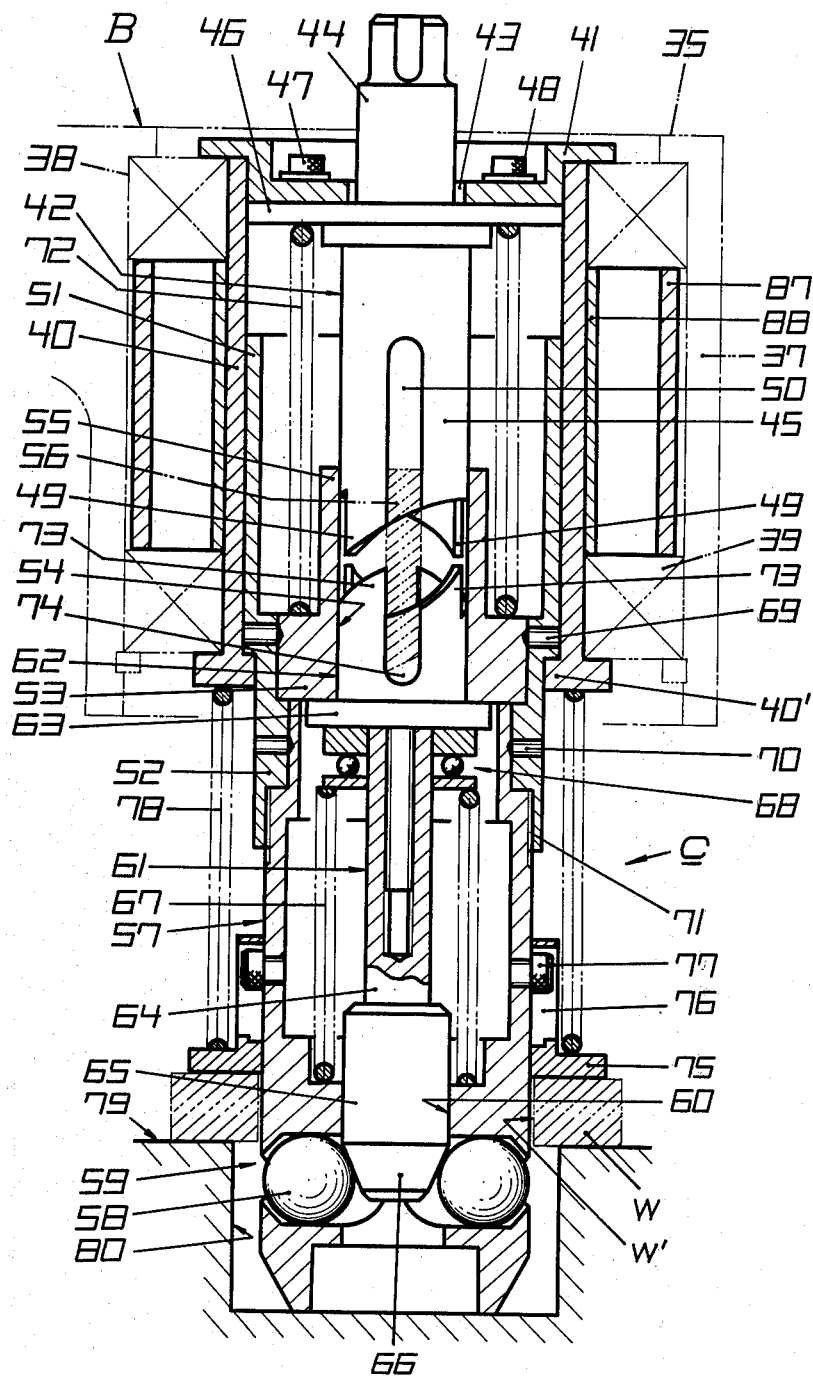

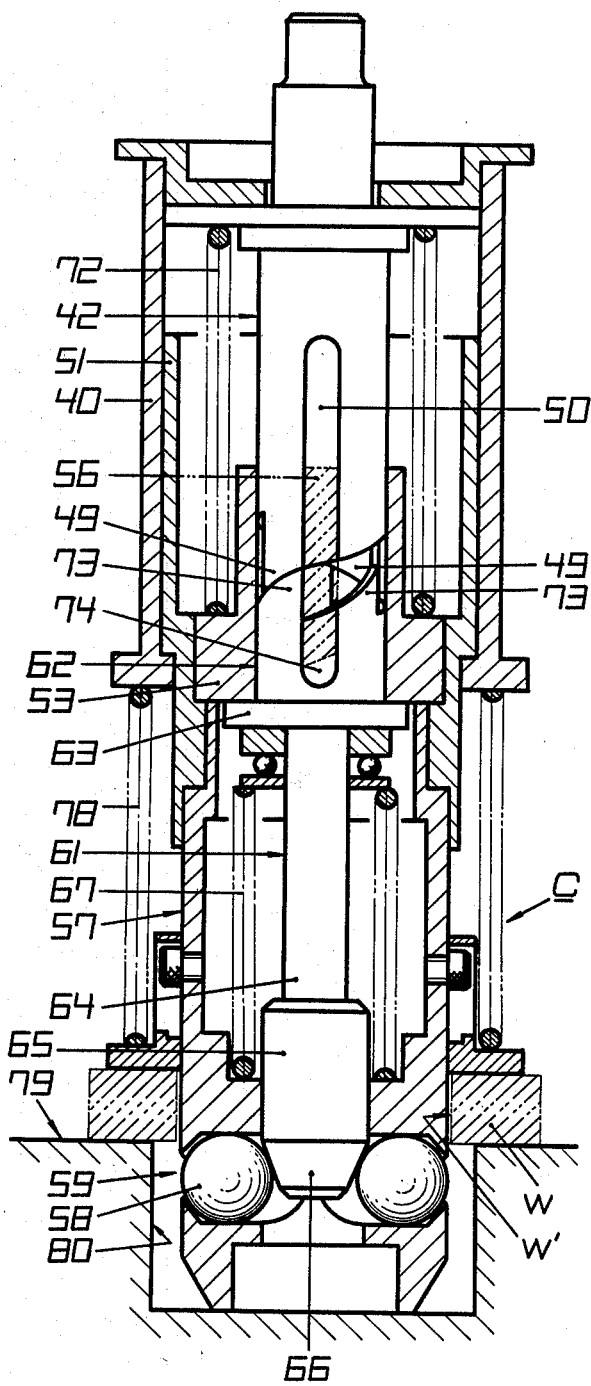

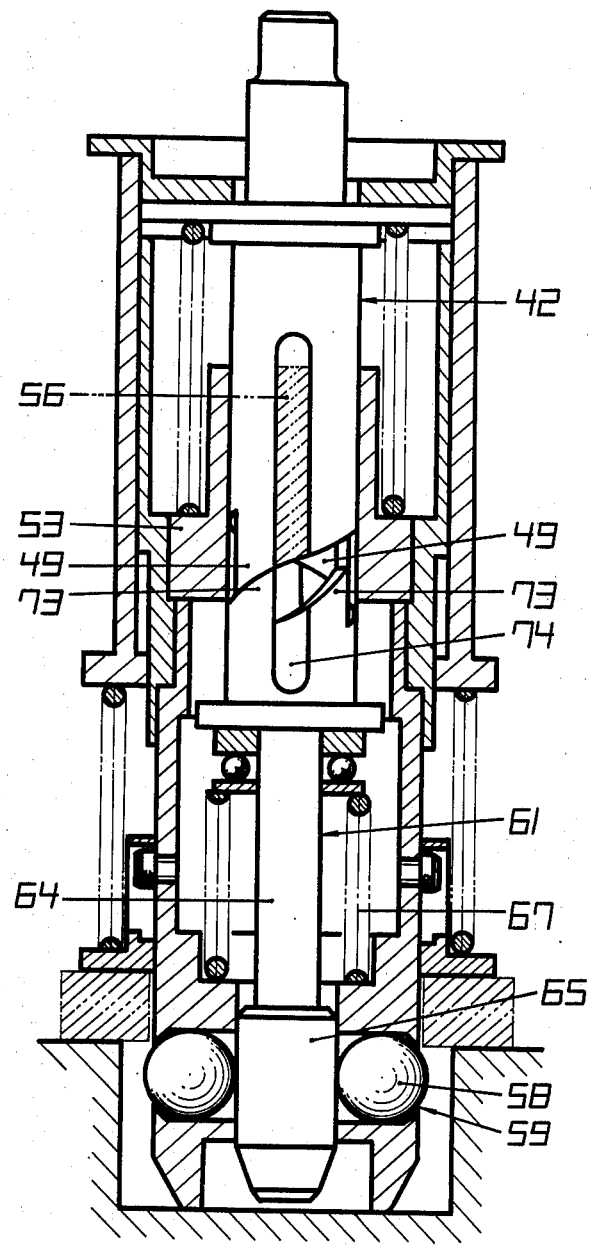

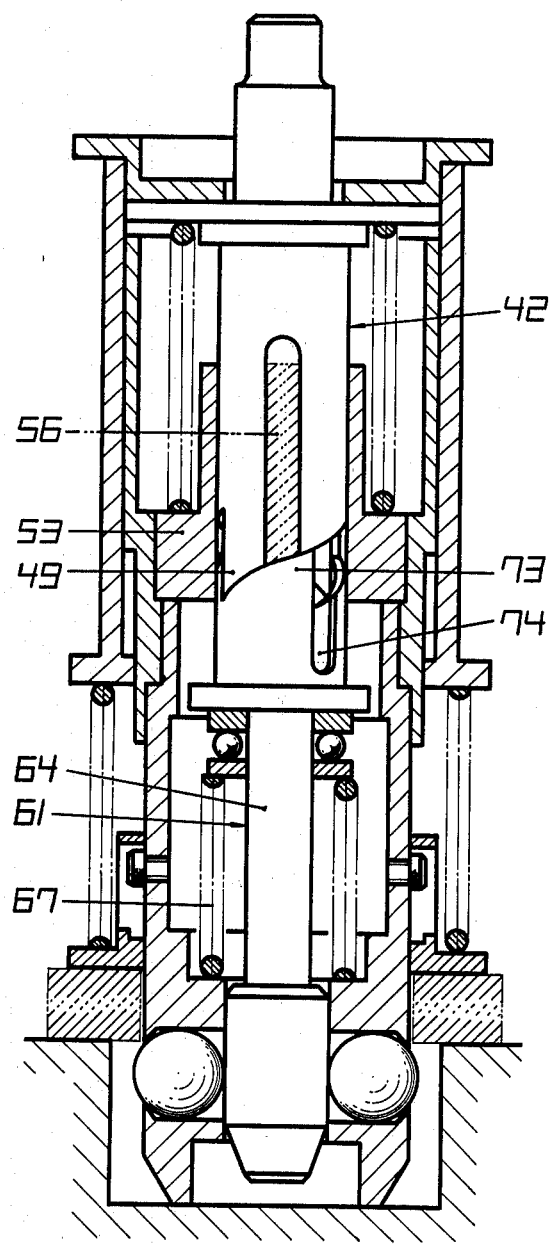

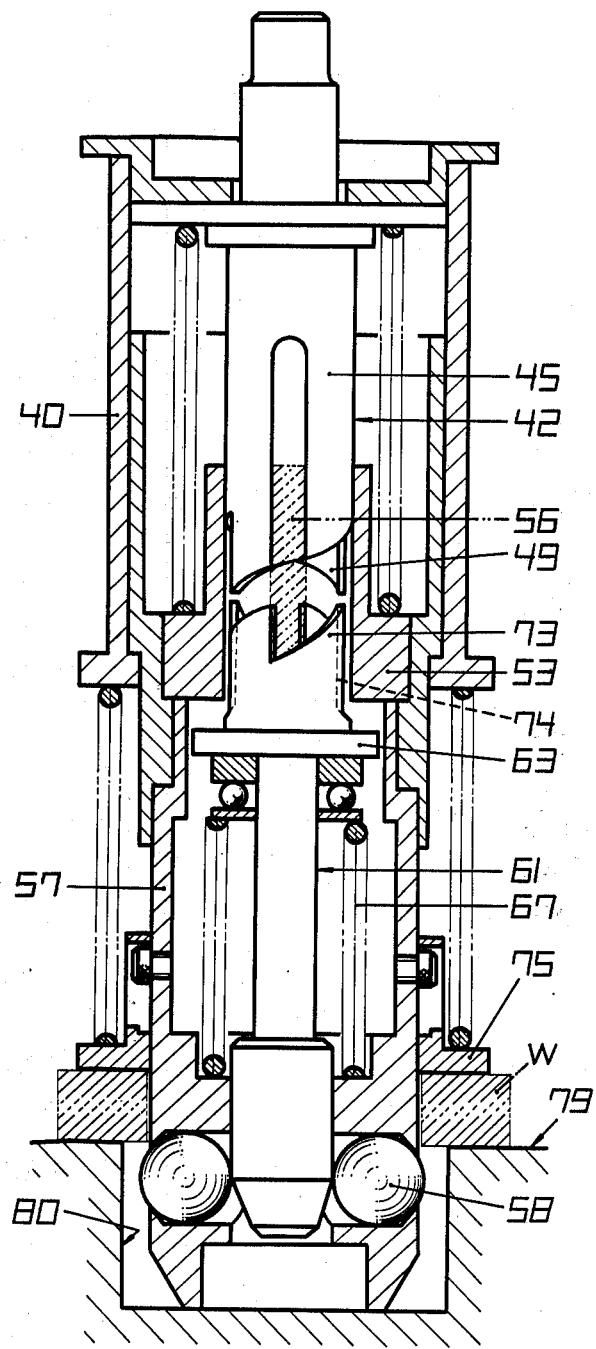

APPARATUS FOR TRANSFER AND TREATMENT OF APERTURED ARTICLES

This application is a continuation-in-part of application Ser. No. 926,200, filed July 19, 1978, now abandoned, which in turn, is a continuation of application Ser. No. 698,594, filed June 22, 1976, now abandoned.

BACKGROUND OF THE INVENTION

The present invention relates to an apparatus wherein an apertured article fed to a loading position and by a pivoting movement and upward and downward movement of an arm member and by the ability of a chucking head to rotate the article, the article is subjected to a desired treatment at a working position, the treated article being released at an unloading position by the reversible revolving movement of the arm member.

As is well known subjecting mass-produced articles, such as the inner and outer races of rolling-contact bearings, and assemblies of inner and outer races and rolling bodies, to a rust-preventing oiling treatment, a washing treatment and the final bar-form packaging operation, requires a large number of workers.

With known conventional methods the thickness of the rust-preventive oil films varies from article to article, which is undesirable from the standpoint of guarantee of quality. Further, the rust-preventive oil is consumed more than is necessary, which is considered to be a factor causing an increase in the running cost.

Generally, the rust-preventive oil applied to products such as bearings should be in the form of a film of uniform thickness, and it is also necessary that the oil films be prevented from flowing out during transport or storage of the articles. For this reason, rust-preventive oils which have a suitable degree of viscosity at ordinary temperature have been used.

In order to treat articles with a rust-preventive oil of such nature by the known methods it is necessary to reduce the viscosity of the rust-preventive oil to render the oil flowable. Therefore, the rust-preventive oil in the holding tank is heated to about 80° C. by suitable means.

In addition to this heating operation, the operation of removal of the excessive oil for obtaining a uniform film takes much time. Furthermore, the conventional apparatus are large in size and accordingly require a large space for installation. Articles treated by such apparatus are built up into stacks each consisting of a predetermined number of articles and then packaged in a bar form or when a large number of articles are handled, they are piled up on a storage block for temporary storage. These operations also take much time.

Labour-saving in connection with simple operations such as those described above is the need of the times, and the mechanical treatment of articles one by one, or the so-called small-groups control is of absolute necessity.

SUMMARY OF THE INVENTION

The present invention relates to an apparatus comprising a vertically movable arm member pivoted at one end about a vertical axis and a chucking head mounted at the other distal end thereof, for engagement with and holding an apertured article, said chucking head being arranged to rotate the chucked article and whereby apertured articles being successively fed to a loading position are subjected to a revolving movement and an upward movement whilst being transferred to an unloading position via a working position where they are subjected to a desired treatment.

Thus, the present invention provides an apparatus which lends itself to subjecting apertured articles to a rust-preventive treatment, a washing treatment or a coating treatment. Thus, such article is held and in this condition it is immersed in a treating liquid or a coating liquid and then rotated above the oil tank, thereby achieving the saving of rust-preventive oil, the throwing off of excessive oil, and the uniformity of coatings.

Since the apparatus of the invention is capable of mechanically carrying out the treatment of articles continually one by one, the problem of foreign articles being mixed in can be easily solved, reduction of the number of workers becomes possible and hence labour-saving can be achieved. Further, by subjecting articles to say a rust-preventive oiling treatment by the apparatus of the present invention, the stabilization of rust-preventive oil films can be achieved, whereby about 20% oil can be saved and the rust-preventive oiling treatment can be carried out at ordinary temperature.

The realization of such rust-preventive oiling treatment at ordinary temperature saves electric power for heating by 100%. Further, since articles are handled by the reversibly revolvable and vertically movable arm member and the chucking head, they can be treated by being arranged in a line and hence there will be no interference between articles, thus protecting them against damage and guaranteeing quality. Further, in rotating articles in the course of operation by the apparatus of the present invention, it becomes secondarily possible to detect defective retainer crimping, defective retainers and defective rollers.

Further, since the invention enables a large amount of articles to be treated in a limited space by a compact apparatus, it contributes much to the improvement of economy and productivity.

The invention is described further with reference to the accompanying drawings.

BRIEF DESCRIPTION OF THE DRAWINGS

FIGS. 1 and 2 illustrate conventional apparatus for rust-preventive oiling treatment;

FIG. 3 is a plan view of an apparatus according to the present invention;

FIG. 4 is a side view of said apparatus;

FIG. 5 is an explanatory view illustrating the order of transfer of articles by the present inventive apparatus;

FIG. 6 is a side view, in longitudinal section, of a body including an arm member and a chucking head; and FIGS. 7 through 11 are enlarged sectional views showing the construction of the chucking head and a sequent operation of the same, FIG. 7 showing an article releasing condition, FIG. 11 showing an article holding condition.

DETAILED DESCRIPTION OF THE PREFERRED EMBODIMENT

Referring to the drawings, FIGS. 1 and 2 illustrate conventional apparatus for rust-preventive oiling treatment of apertured articles. As shown at a, b and c in FIG. 1, a chute 1 is used to put articles 2 in a cage 3 of metal netting, which is then immersed in rust-preventive oil 5 (at about 80° C.) in a tank 4 and withdrawn from the tank 4, whereupon the excessive oil is removed by a suitable method. Another method, shown in FIG.

2, uses a chute 11 to place articles on a conveyor 12 which is passed through rust-preventive oil 14 (at about 80° C.) in the course of its travel, the articles 13, after having the excessive oil removed therefrom, being fed to the next process.

FIG. 3 is a top view of an apparatus according to the present invention, showing an outline of the operation. In this Figure, A designates a robot apparatus; B, an arm member of the robot apparatus; C, a chucking head mounted at the distal end of the arm member; D, a rust-preventive oil tank; E, an auxiliary tank; F, a loading position; G, a working position; H, an unloading position; and I designates a chute member having one end thereof positioned at the unloading position so that articles after treatment may be conveyed to the next process by said chute I. In addition, N designates a pipe by which the rust-preventive oil tank D and the auxiliary tank E are connected together, and O designates a valve.

FIG. 4 is a side view of the apparatus of FIG. 3, wherein J designates an article setting position just above the working position G, i.e., the rust-preventive oil tank D; K, a position at which an article held by the chucking head is immersed in the rust-preventive oil in the rust-preventive oil tank; and L designates a rotation operating position at which the chucking head is rotated to throw off the excessive oil from the article withdrawn from the oil after a predetermined period of immersion in the rust-preventive oil.

In brief, according to the invention an article W chucked at the loading position F is conveyed to the article setting position J in the working position G and it is forcibly immersed in the rust-preventive oil M in the tank by the downward movement of the arm member B and then pulled up by the upward movement of the arm B to a position shown at L where the chucking head C is rotated to centrifugally throw off the excessive oil, whereupon the article is brought back to the position J, from which it is conveyed to the unloading position H by the revolving movement of the arm member B and released onto the chute member I. Finally, the arm member B returns to the loading position F to complete a cycle of operation. FIG. 5 indicates schematically the order in which said series of operation take place in order as numbered.

The construction of the robot apparatus A will now be described with reference to FIG. 6. Designated at 20 is a rigid frame body of metal, with a pivot shaft 21 erected beside the same. Designated at 22, 23 and 24 are bearings for rotatably supporting the pivot shaft 21, the lower end of the latter being connected to a revolving device 81. Thus, it is connected to an external power source through a worm wheel 25 and a worm 26. Designated at 27 and 28 are arm plates having one of their respective ends fixed to the upper and lower portions of the pivot shaft, respectively, and the other ends fixed to the upper and lower ends of a shaft 29. The arm member B is mounted so that it may be parallelly translated along said shafts 21 and 29 in a vertical direction by a drive unit 85 such as an air cylinder fixed on the arm plate 27, and it is so arranged that the reversible revolving movement of the pivot shaft 21 is transmitted to the arm member B through the arm plates 27, 28 and shaft 29. Designated at 30 and 31 are bearings such as ball bushings for supporting the base 32 of the arm member B for rotation and slide movement relative to the pivot shaft 21, and 33 is a bearing such as a ball bushing for supporting the intermediate portion 34 of the arm member B for rotation and slide movement relative to the shaft 29. The distal end 35 of the arm member B is provided with an article chucking head C, which is rotatably installed in a sleeve 37 at the distal end 35 of the arm member B through bearings 38 and 39.

The construction of the chucking head C will now be described with reference to FIG. 7. A first sleeve 40 rotatably mounted in the sleeve 37 of the arm member B through the bearings 38 and 39 has a flange 40' around the inner periphery of the lower edge thereof and a cover member 41 fixed to the upper open end thereof. An upper shaft member 42 fixed to said cover member 41 has a shaft portion 44 upwardly extending through an opening 43 in the cover member 41, a downwardly extending shank portion 45, and a flange portion 46 adjacent the upper end thereof joined to the cover member 41. Designated at 47 and 48 are screw members for connecting the flange portion 46 of the shaft member 42 to the cover member 41. The shank portion 45 of the upper shaft member 42 is formed at the lower edge thereof with two jaws 49 defined by vertical and sloping surfaces and is also formed in the periphery thereof with two axially extending keyways 50. In addition, 87 and 88 are spacer members. A second sleeve 51 slidably inserted in the first sleeve has in the lower half a sleeve portion 52 of smaller diameter integral therewith and downwardly extending beyond the first sleeve 40. A partition member 53 fixed to the inside of the second sleeve 51 has an opening 54 for receiving the shank portion 45 of the upper shaft member 42, and an upwardly extending sleeve portion 55 integral therewith. Further, the inner surface of the opening 54 is formed as a unit with two axially extending keys 56 opposed to the two keyways 50 in the shank portion 45 of the upper shaft member 42, the upper portions of said keys being fitted in the keyways 50. The lower edges of the keys 56 have sloping surfaces identical with those of the jaws 49.

Designated at 57 is a downwardly extending pipe member fixed in the opening in the lower end of the sleeve 51. The pipe member 57 is slightly smaller in outer diameter than the apertures W' of articles W to be treated and is peripherally formed with a plurality of equispaced, radially extending windows 59 for accommodating projectable members 58, such as balls and plates, in such a manner that they can be projected through and retracted from said windows. The lower portion of the pipe member 57 is formed with an opening 60 which extends axially so as to be in contact with said windows 59. Thus, the opening 60 and windows 59 communicate with each other.

A lower shaft member 61 consists of a shank portion 62 adapted to be fitted in the opening 54 in the partition member 53, and a spindle portion 64 extending downwardly from a flange portion 63. The front edge of the spindle portion 62 is formed with four equispaced jaws 73 defined by vertical and sloping surfaces. The periphery of the spindle is formed with two axially extending keyways 74 engageable with the keys on the inner surface of the partition member. In addition, the keyways 74 are disposed at locations each corresponding to a "valley" between two adjacent jaws 73. Further, the lower end of the spindle portion 64 is formed with a larger-diameter portion 65 adapted to be fitted in the opening 60 in the pipe member 57, and a small-diameter portion 66 extending downwardly from said large-diameter portion 65. In addition, the spindle portion 64 is joined to the lower end of the flange portion 63 by making use of a threaded bar fixed to said lower end, for example.

The lower shaft member 62 extends through the pipe member 57 so that the large-diameter portion 65 and the small-diameter portion 66 thereof may be alternately associated with the projectable members 58 in response to the longitudinal displacement of the lower shaft member 1. This longitudinal displacement of the lower shaft member 61, which will be described hereinafter, takes place as a result of engagement and disengagement of a clutch mechanism which is defined by the jaws 49, 73 and keyways 50, 74 of the upper and lower shaft members 42, 61 and the keys 56 on the inner surface of the partition member 53.

A spring 67 for upwardly urging the shaft member 61 is installed in the pipe member 57 and pushes up the flange portion 63 through a thrust bearing 68. The second sleeve member 51, partition member 53 and pipe member 57, which are connected together by set screws 69, 70 and threads 71, are downwardly urged by a spring 72 at all times.

A ring member 75 loosely mounted on the pipe member 57 has two axially extending windows 76, which receive the heads of stop members 77 screwed into the periphery of the pipe member 57, thereby preventing the slipping off of the ring member 75 and limiting the range of its upward movement. Designated at 78 is a compression spring interposed between the end face of the first sleeve member 40 and the ring member 75.

The shaft portion 44 of the upper shaft member 42, as shown in FIG. 6, has a gear 82 fixed thereto meshing with a gear 85 on the output shaft 84 of a rotation drive unit 83 such as a geared motor fixed to the distal end of the arm member B, so that the chucking head C can be rotated at high speed as required. In addition, pulleys and a belt may be used to transmit the torque from the motor to the shaft portion 44 of the upper shaft member 42.

The condition shown in FIG. 7 is such that the lower ends of the keys 56 are engaged in the keyways 74 in the shank portion 62 of the lower shaft member 61 and the flange portion 63 is urged against the lower surface of the partition member 53, so that the small-diameter portion 66 of the spindle portion 64 is positioned amidst the projectable members 58 which are now retracted into the windows 59. Thus, in this condition, no article is held.

The operation for holding an article by the chucking head C will be as follows.

An article W having an aperture W' to be held by the chucking head C is placed on a suitable block member 79. The block member 79 has a recess 80 for receiving the front end of the pipe member 57, and the article W is fed to said recess 80 in such a manner as to align the aperture W' with the latter. Thereafter, the arm member B is lowered. As the arm member B is lowered, the pipe member 57 is lowered, and abuts against the bottom of the recess 80 in the block member 79 as shown in FIG. 7. Even after the pipe member 57 has abutted against the bottom of the recess 80, the arm member B continues its downward movement, with the result that the first sleeve 40 and upper shaft member 42 are downwardly moved relatively to the second sleeve 51, partition member 53 and pipe member 57, while compressing the springs 72 and 78.

The downward movement of the upper shaft member 42 brings the jaws 49 of the upper shaft member 42 into abutment against the jaws 73 of the lower shaft member 61 as shown in FIG. 8 and thereafter the lower shaft member 61 is downwardly moved against the force of the spring 67. As a result, the large-diameter portion 65 of the spindle portion 64 is thrusted into the middle of the assembly of the projectable members 58, pushing them aside with its peripheral surface, so that they are projected through the respective windows 59 in unison (FIG. 9).

On the other hand, as shown in FIG. 9, when the lower shaft member 61 is lowered a predetermined distance, the keys 56 on the inner surface of the partition member 53 are disengaged from the keyways 74, whereupon the lower shaft member 61 is rotated until the vertical surfaces of the jaws 73 abut against the vertical surfaces of the jaws 49, i.e., through an angle of 45° by a torque exerted owing to the fact that the sloping surfaces of the jaws 49 and 73 are abutting against each other and that the spindle portion 64 is upwardly urged by the spring 67 (FIG. 10).

In this condition, the arm member B enters on its upward travel. As the arm member B moves upwardly, the upper shaft member 42 is also pulled up. However, no upward movement of the lower shaft member 61 takes place since the sloping surfaces of its jaws 73 are abutting against the lower sloping ends of the keys 56 on the partition member 53. Furthermore, the vertical surfaces of the jaws 73 of the lower shaft member 61 are abutting against the vertical surfaces of the jaws 49 of the upper shaft member 42, so that the torque along the sloping surfaces has been overcome. The jaws 49 of the upper shaft member 42 continue upwardly moving, and when the vertical surfaces of the jaws 49 are eventually disengaged from the vertical surfaces of the jaws 73, the lower shaft member 61 is rotated another 45° along the lower sloping ends of the keys 56, so that the lower shaft member 61 is moved upwardly to some extent until the valleys between the jaws 73 abut against the keys 56, to assume the condition shown in FIG. 11. Thus, the article W is clamped between the projectable members 58 and the ring member 75. Thereafter, as the arm member B is upwardly moved, the article W is lifted from the block member 79.

The operation for releasing the article W from the chucking head C in the condition shown in FIG. 11 is as follows.

The arm member B is lowered and the front end of the pipe member 57 eventually abuts against the bottom of the recess 80 in the block member 79. The further lowering of the arm member B casuses the downward movement of the first sleeve 40 and upper shaft member 42, as described above with respect to FIGS. 7 and 8, and the resulting abutment between the jaws 49 and 73 pushes down the lower shaft member 61, with the result that the vertical surfaces of the jaws 73 are disengaged from the keys 56 like as described with respect to FIG. 9, whereupon the lower shaft member 61 is rotated 45° along the sloping surfaces of the jaws 49 and 73 in a similar manner as described with respect to FIG. 10. In this condition, the arm member B enters on its upward travel, bringing with it the first sleeve 40 and upper shaft member 42. As the upper shaft member 42 is upwardly moved, the lower shaft member 61 is also upwardly moved by the energy stored in the spring 67 until the sloping surfaces of the jaws 73 abut against the lower sloping surfaces of the keys 56. When the vertical surfaces of the jaws 49 are disengaged from the vertical surfaces of the jaws 73, the lower shaft member 61 is rotated 45° along the sloping surfaces of the keys 56 in a like manner as described with respect to FIG. 11, so that the keyways 74 are aligned with the keys 56. This alignment permits the upward movement of the lower shaft member 61. That is, it is upwardly moved until the flange portion 63 abuts against the lower surface of the partition member 53, as shown in FIG. 7.

This upward movement of the lower shaft member 61 causes the small-diameter portion 66 to assume a position where it is associated with the projectable members 58, so that the latter are retracted from the windows 59 to release the article W. The arm member B is then upwardly moved with the pipe member 57 assuming the position shown in FIG. 7, leaving the article W placed on the clock member 79.

What has been described so far is the sequent operation of the chucking head. In addition, the clutch mechanism of the chucking head C described above has been well-known in the art of ball-point pens.

What I claim is:

1. An apparatus for the transfer of an apertured article in sequential order from a loading station to a treating station and thereafter to a discharge station comprising: vertically disposed frame element means; an arm member mounted at one end on the upper portion of said vertical frame element means in reversibly revolvable horizontal relationship thereto and also in vertically movable relationship thereto; first means for revolvablly moving said arm member back and forth in a horizontal plane and in sequential order from a loading station, thereafter to a treating station, and finally to a discharge station; second means for vertically moving said arm member up and down on said frame element means; a chucking head mounted at the other end of said arm member in a revolvable state about a vertical axis of rotation for chucking an apertured article; and third means for rotating said chucking head at a high rate of speed about the vertical axis of rotation.

2. An apparatus in accordance with claim 1, wherein said vertical frame element means includes a vertically disposed first pivot shaft, a pair of horizontally disposed arm plates mounted at one end on said pivot shaft in vertically spaced relationship, a second shaft mounted on said arm plates in spaced, parallel relationship to said first pivot shaft and the arm member is connected at its distal end to said first pivot shaft and at its intermediate portion to said second shaft.

3. An apparatus in accordance with claim 1, wherein said chucking head comprises: a first sleeve rotatably mounted to the distal end of said arm member; an upper shaft member fixed to said first sleeve, said upper shaft member having two jaw portions formed at the lower end thereof and two keyway portions formed in the periphery thereof; a second sleeve slidably inserted in said first sleeve, said second sleeve having a downwardly extending pipe member fixed to the lower portion thereof, said pipe member being provided adjacent its front end with windows for accommodating projectable members for releasable engagement with an aperture of of the apertured article; a partition member fixed inside said second sleeve and downwardly urged by a first spring against the lower end of said first sleeve, said partition member having two keys formed on the inner surface thereof; a lower shaft member slidably inserted in said partition member and upwardly urged by a second spring, said lower shaft member having four jaw portions formed at the upper end thereof and two keyway portions formed in the periphery thereof, said lower shaft further having a large-diameter portion and a small-diameter portion adjacent its lower end extending through said pipe member; and a ring member mounted on the periphery of said pipe member and downwardly urged by a third spring so as to be displaceable within a given range; wherein said jaws and keyways of the upper and lower shaft members and said keys on the inner surface of the partition member cooperate with one another to define clutch means, and wherein said lower shaft member may assume two different longitudinal positions as a result of engagement and disengagement of said clutch means in response to the upward and downward movement of the first sleeve and upper shaft member, with the arrangement being such that the resulting displacement of the large-diameter portion and the small-diameter portion of the lower shaft member causes said projectable members to be projected through and retracted from said windows.

4. An apparatus in accordance with claim 3, wherein said projectable members received in the windows in the pipe member are balls.

5. An apparatus in accordance with claim 3, wherein said spring upwardly urging the lower shaft member acts on the latter through the thrust bearing disposed therebetween.

* * * * *